United States Patent
Gorham et al.

(10) Patent No.: US 10,458,601 B1
(45) Date of Patent: Oct. 29, 2019

(54) SAFETY SYSTEM FOR GAS CYLINDER VALVES AND METHOD OF USE

(71) Applicants: Robert Gorham, San Marcos, TX (US); Cooper Gorham, San Marcos, TX (US)

(72) Inventors: Robert Gorham, San Marcos, TX (US); Cooper Gorham, San Marcos, TX (US)

( * ) Notice: Subject to any disclaimer, the term of this patent is extended or adjusted under 35 U.S.C. 154(b) by 0 days.

(21) Appl. No.: 15/793,896

(22) Filed: Oct. 25, 2017

(51) Int. Cl.
*F17C 13/04* (2006.01)
*F16K 35/02* (2006.01)
*F17C 13/12* (2006.01)
*F16K 31/44* (2006.01)

(52) U.S. Cl.
CPC ............ *F17C 13/123* (2013.01); *F16K 31/44* (2013.01); *F16K 35/027* (2013.01); *F17C 13/04* (2013.01); *F17C 2205/037* (2013.01); *F17C 2205/0329* (2013.01)

(58) Field of Classification Search
CPC ........ F16K 35/02; F16K 35/027; F16K 31/44; F16K 31/53; F16K 31/535; F17C 13/04; F17C 13/123; F17C 2205/0329; F17C 2205/037
USPC .......... 251/90, 96, 95, 97; 74/548; 192/55.1, 192/69, 41 R, 65
See application file for complete search history.

(56) References Cited

U.S. PATENT DOCUMENTS

| | | | | |
|---|---|---|---|---|
| 391,992 A * | 10/1888 | Turner | ................. | A01K 89/015 242/259 |
| 893,184 A * | 7/1908 | Mercer | .................... | B62D 1/10 251/77 |
| 1,516,152 A * | 11/1924 | Dumont | .............. | E05B 17/0058 16/414 |
| 1,672,582 A * | 6/1928 | Tenney | ..................... | F16D 9/06 192/110 R |
| 1,851,307 A * | 3/1932 | Hazelton | .................. | G05G 7/04 192/19 |
| 3,064,455 A * | 11/1962 | Gros | ..................... | F16D 43/216 464/47 |
| 3,397,592 A | 8/1968 | Möller | | |
| 3,473,408 A * | 10/1969 | Bettinger | ................. | G05G 1/10 192/79 |
| 3,685,280 A * | 8/1972 | Fehrenbacher | ........ | G04B 19/21 235/1 C |
| 3,853,236 A | 12/1974 | Ostrowsky | | |

(Continued)

*Primary Examiner* — Robert K Arundale
(74) *Attorney, Agent, or Firm* — White Law Group, PLLC

(57) ABSTRACT

A safety system for a gas cylinder valve stem includes a coupler and a handwheel. The coupler includes a first engagement mechanism (EM). The coupler is configured to: mount onto the stem's base; and rotate the stem in unison with rotation of the coupler or remain stationary in unison with the stem. The handwheel includes a second EM configured to engage in surface-to-surface contact with the first EM. A locking mechanism is defined by the first and second EMs. The handwheel is configured to mount onto the stem's intermediate portion between the stem's tip and the coupler's proximal top surface. The handwheel is configured to rotate about the stem's longitudinal axis, in response to receiving an angular force of rotation in a lateral plane. The handwheel rotates in unison with the coupler when the locking mechanism is engaged, yet rotates independent from the coupler when the locking mechanism is disengaged.

20 Claims, 6 Drawing Sheets

(56) References Cited

U.S. PATENT DOCUMENTS

| | | | | |
|---|---|---|---|---|
| 4,062,203 A | * | 12/1977 | Leonard | B25B 23/141 |
| | | | | 464/38 |
| 4,298,129 A | | 11/1981 | Stull | |
| 4,375,172 A | * | 3/1983 | Richards | F16D 23/02 |
| | | | | 192/108 |
| 4,549,716 A | * | 10/1985 | Warren | F16K 31/60 |
| | | | | 192/69.91 |
| 4,674,347 A | * | 6/1987 | Nishida | F16D 43/216 |
| | | | | 192/55.1 |
| 4,782,861 A | * | 11/1988 | Ross | F17C 13/04 |
| | | | | 137/505.38 |
| 5,093,959 A | * | 3/1992 | McTargett | F16K 31/607 |
| | | | | 16/422 |
| 5,435,179 A | * | 7/1995 | Sands | G01F 15/18 |
| | | | | 285/302 |
| 5,513,831 A | * | 5/1996 | Seward | F16K 35/027 |
| | | | | 192/95 |
| 5,551,124 A | * | 9/1996 | Zeringue | F16K 31/60 |
| | | | | 16/441 |
| 5,741,003 A | * | 4/1998 | Segien, Jr. | F16K 31/60 |
| | | | | 16/441 |
| 2013/0306198 A1 | * | 11/2013 | Prest | B22D 19/00 |
| | | | | 148/403 |
| 2013/0327971 A1 | | 12/2013 | Anderson | |
| 2014/0060687 A1 | * | 3/2014 | Cohen | E03C 1/02 |
| | | | | 137/801 |
| 2015/0027841 A1 | * | 1/2015 | Kainuma | F16D 11/14 |
| | | | | 192/69 |
| 2016/0341332 A1 | * | 11/2016 | Iwanaga | F16K 31/60 |

\* cited by examiner

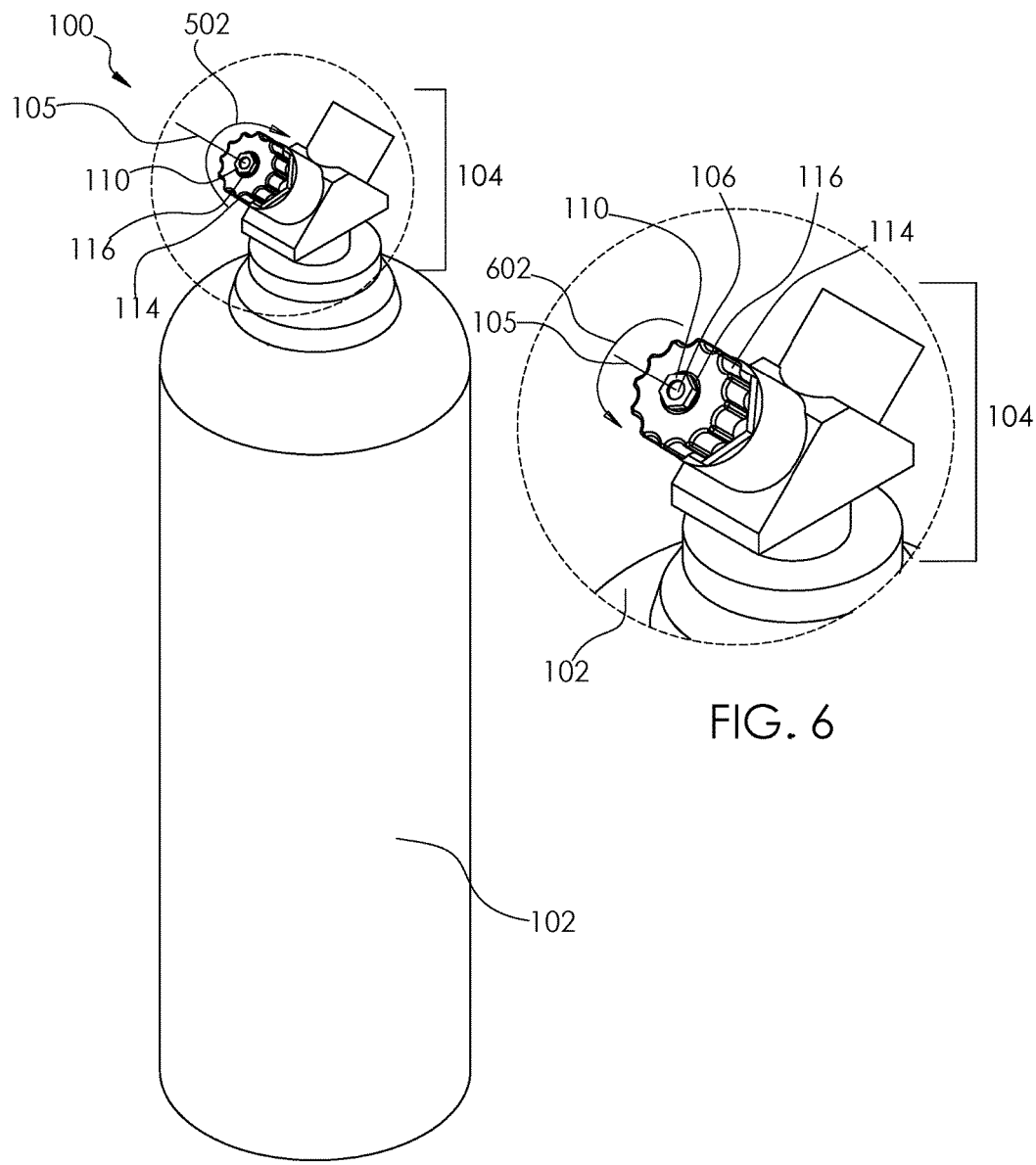

SAFETY SYSTEM FOR GAS CYLINDER VALVES AND METHOD OF USE

BACKGROUND

1. Technical Field

The present disclosure generally relates to valves for controlling flow of gas from cylinders in which the gas is stored under pressure. More particularly, the present disclosure relates a safety system for gas cylinder valves.

2. Description of the Related Art

Transportation of compressed gasses (for example, nitrous oxide ($N_2O$), oxygen, hydrogen, acetylene ($C_2H_2$)) within cylinders is a widespread industry. In fact, acetylene gas cylinders and oxygen gas cylinders can be bought from retail outlets in torch kits. The transportation of high-pressure cylinders is regulated by many governments throughout the world. Similarly, governments regulate the transportation of highly flammable gases (such as acetylene and propane), which are often stored in low-pressure gas cylinders, as highly flammable gases present a serious safety hazard. These gas cylinders are fitted with metal valves. For example, acetylene cylinders are normally fitted with metal valves that may be either handwheel or key operated.

Acetylene is the most common gas used for fueling cutting torches, and the benefits of acetylene for welding is well known. Acetylene has a very wide range of flammability, which means that almost any leak of acetylene will result in a flammable gas mixture. When exposed to excess temperature, pressure, or mechanical shock, pure or less than pure acetylene gas can undergo a violent, explosive decomposition reaction. Decomposition is a spontaneous reaction forming hydrogen and carbon in the form of soot, and a large amount of heat and pressure is generated by this reaction. According to the United States Department of Labor, acetylene is very easy to ignite, as the energy from a static spark capable of igniting acetylene is lower than for any other fuel gas except hydrogen. The static charge developed by walking across a carpet floor on a dry day can be 1700 times greater than that needed to ignite acetylene. Cylinders containing acetylene, like all gas cylinders, should be transported, stored and handled properly to ensure they are safe. When transported and used correctly, acetylene is safe gas, as it is classified as non-toxic.

Unfortunately, many users fail to apply appropriate restraints to prevent cylinders from toppling over or moving around in the vehicle. During transport of acetylene, the cylinder handwheel valve can knock against something which opens the valve. This allows gas to escape, and can result in a fire or explosion. This can result in fires and injuries.

SUMMARY

In a first embodiment, a safety system for a gas cylinder valve stem is provided. The stem is rotatable to actuate the valve to an open position and a closed position. The stem has a proximal end tip portion, a distal end base, and a center longitudinal axis of rotation. The safety system includes a coupler and a handwheel. The coupler includes a first engagement mechanism. The coupler is configured to: mount onto the base of the stem. The coupler is also configured to rotate the stem in unison with rotation of the coupler or remain stationary in unison with the stem while the stem is stationary. The handwheel includes a second engagement mechanism of a locking mechanism. The locking mechanism is defined by the first and second engagement mechanisms. The second engagement mechanism is configured to engage in surface-to-surface contact with the first engagement mechanism. The handwheel is configured to mount onto an intermediate portion of the stem between the tip portion and a proximal top surface of the coupler. The handwheel is configured to rotate about the longitudinal axis, in response to receiving an angular force of rotation in a lateral plane. The rotation of the handwheel is in unison with the coupler when the locking mechanism is engaged. The rotation of the handwheel is independent from the coupler when the locking mechanism is disengaged. The handwheel is configured to disengage or prevent engagement of the locking mechanism, in response to receiving one of: (i) an angular force of rotation in a lateral plane, or (ii) a non-angular force along the longitudinal axis, wherein the longitudinal axis is orthogonal to the lateral plane. The handwheel is further configured to engage the locking mechanism, in response to receiving a combination of: (i) the angular force of rotation in the lateral plane, and (ii) the non-angular force along the longitudinal axis; and to rotate about the longitudinal axis in unison with the coupler and in a direction of the angular force when the locking mechanism is engaged, thereby also rotating the stem in unison with the handwheel and the coupler.

In a second embodiment, method of operating a gas cylinder valve is provided. The valve includes a valve stem that is rotatable to actuate the valve to an open position and a closed position. The stem has a proximal end tip portion, a distal end base, and a center longitudinal axis of rotation. The method includes providing a safety system for a gas cylinder valve stem. The safety system includes a coupler and a handwheel. The coupler includes a first engagement mechanism. The coupler is configured to rotate the stem in unison with rotation of the coupler or remain stationary in unison with the stem while the stem is stationary. The handwheel includes a second engagement mechanism of a locking mechanism. The locking mechanism is defined by the first and second engagement mechanisms. The second engagement mechanism is configured to engage in surface-to-surface contact with the first engagement mechanism. The method further includes mounting the coupler onto the base of the stem. The method further includes mounting the handwheel onto an intermediate portion of the stem between the tip portion and a proximal top surface of the coupler. The method further includes rotating the handwheel about the longitudinal axis, by applying, at the handwheel, an angular force of rotation in a lateral plane. The rotation of the handwheel is in unison with the coupler when the locking mechanism is engaged. The rotation of the handwheel is independent from the coupler when the locking mechanism is disengaged. The method further includes disengaging or preventing engagement of the locking mechanism, in response to receiving, at the handwheel, one of: (i) the angular force of rotation in the lateral plane, or (ii) the non-angular force along the longitudinal axis. The method includes engaging the locking mechanism in response to receiving, at the handwheel, a combination of: (i) the angular force of rotation in the lateral plane, and (ii) the non-angular force along the longitudinal axis. The method further includes rotating the handwheel and the coupler in unison about the longitudinal axis and in the direction of the angular force when the locking mechanism is engaged, thereby also rotating the stem in unison with the handwheel and the coupler.

BRIEF DESCRIPTION OF THE DRAWINGS

The accompanying figures illustrate certain embodiments and may aid in a more complete understanding of this disclosure. This disclosure makes reference to the following figures, in which:

FIG. 5 illustrates a fully assembled view of the safety system for handwheel-operated gas cylinder valves and the gas cylinder of FIG. 1;

FIG. 6 illustrates a detailed view of fully assembled view of the safety system for gas cylinder valves and the gas cylinder of FIG. 5;

DETAILED DESCRIPTION

FIGS. 1 through 10, discussed below, and the various embodiments are used to describe the principles of the present invention in this patent document. The embodiments illustrated are to be understood as examples and in no way limited of the overall scope of this disclosure. One skilled in the art will understand that the principles of the invention may be implemented in any type of suitably arranged device or system. Throughout the drawings, like reference numbers refer to like elements, features, and structures.

The neck of a standard gas cylinder includes a bore with standard sized threads designed to mate with standard threads of a gas cylinder valve. That is, differently designed gas cylinder valves can have identical, standard sized threads in order to exchangeable, fitting a standard gas cylinder. That is, a gas cylinder valve attaches to the top of the gas cylinder and controls the flow of gases from the gas cylinder. The gas cylinder valve is manually operated and can be either handwheel-operated or key-operated. Considering that users sometimes lose the key needed to turn a key-operated valve, many users choose handwheel-operated valves.

The handwheel of the gas cylinder valve is very easy to turn, and will open the gas cylinder valve when the slightest pressure (known colloquially as hair trigger pressure) is applied to the handwheel. For example, if a person barely bumps the handwheel or if the gas cylinder rolls around inside a van, then the handwheel of the gas cylinder valve could turn and open the gas cylinder valve. When the gas cylinder valve is open, gases stored within the gas cylinder flows out or leaks out. Users are cautioned against transporting gas cylinders in vehicles that are not well-ventilated, such as within vans. A slow flow of gas out of the gas cylinder, into a space that is not well-ventilated, can lead to concentrations of flammable gas, especially if left overnight. Concentrated flammable gas can contribute to a fire or lead to a violent, high-energy explosion. One way that users of gas cylinders often fail to ensure that the gas cylinders are safe is by failing apply appropriate restraints to prevent gas cylinders from toppling over or moving around in the vehicle. During transport of acetylene, the handwheel of the gas cylinder valve can knock against something (for example, a wall of the vehicle, or a neighboring cylinder) which opens the valve. This open valve allows acetylene gas to escape, and can result in a fire or explosion, which could result in fires and injuries. As described more particularly below, the safety system for gas cylinder valves according to embodiments of this disclosure overcomes these disadvantages.

Figure 1:
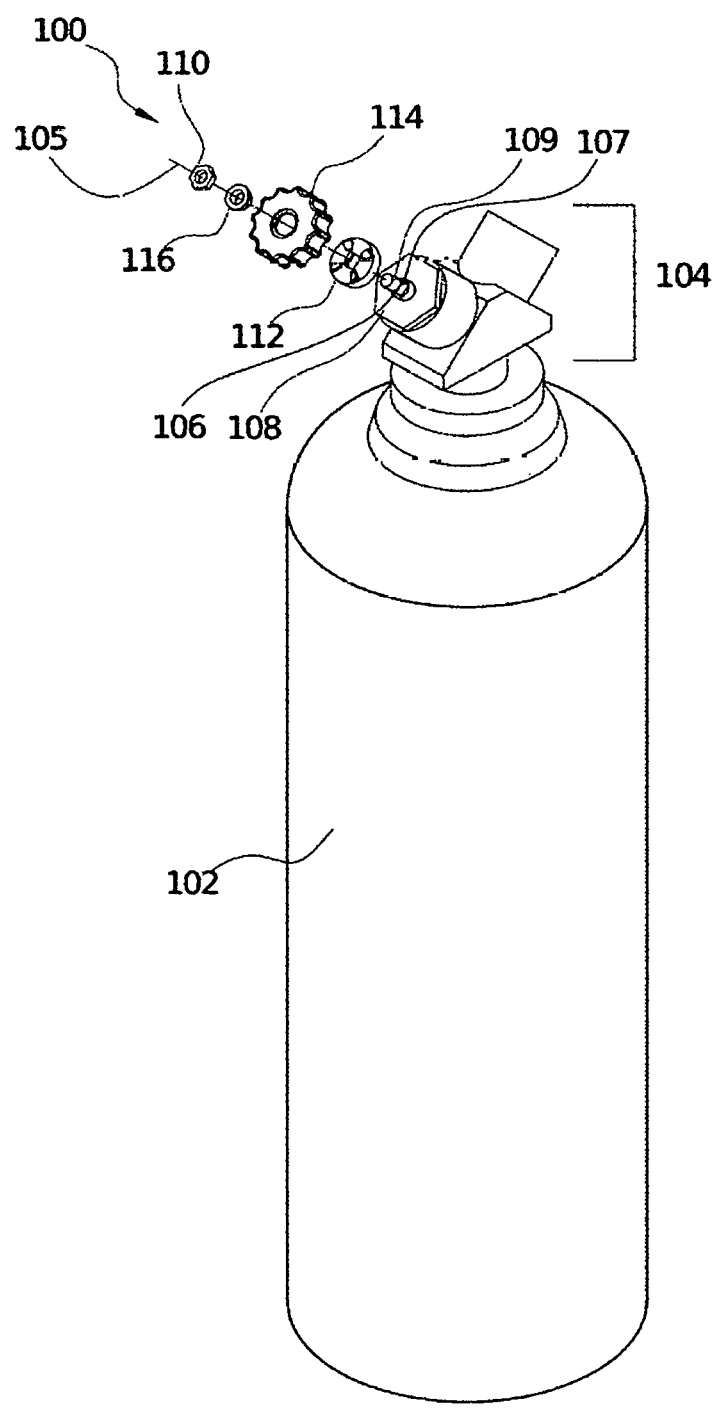
FIG. 1 illustrates an exploded assembly view of a safety system for handwheel-operated gas cylinder valves and a gas cylinder, according to embodiments of this disclosure.

FIG. 1 illustrates an exploded assembly view of a safety system 100 for handwheel-operated gas cylinder valves and a gas cylinder 102, according to embodiments of this disclosure. In safety system 100, in order to open the gas cylinder valve, a user is required to both push and turn the handwheel. More particularly, in safety system 100, in order to open the gas cylinder valve, the handwheel not only requires an angular force of rotation (namely, turning), but also requires an additional non-angular force (for example, pushing) to be applied at the same. The additional non-angular force could be an axial pressure along a longitudinal axis. In certain embodiments, the additional non-angular force could be a lateral force. The additional non-angular force prevents gas cylinder valves from unintentionally opening due to mere rotation of the handwheel.

The gas cylinder 102 is designed to contain a flammable gas. The example gas cylinder 102 shown in FIG. 1 is for illustration only, and other gas cylinders could be used without departing from the scope of the present disclosure. For simplicity, the cylinder 102 and other features of this disclosure are described in terms of being used for acetylene. It is understood that embodiments of this disclosure are not limited to being used for acetylene, and other flammable gases can be used, or high-pressure gases can be used. As an example, the cylinder 102 could be a size MC cylinder that has a volume of 10 cubic feet, or any other size. In some implementations, the cylinder could contain acetylene gas at low pressure of 15 psi or lower.

A gas cylinder valve 104 is attached to the neck of the cylinder 102. The example gas cylinder valve 104 shown in FIG. 1 is for illustration only, and other gas cylinders valves could be used without departing from the scope of the present disclosure. The valve 104 includes a stem 106 that, when turned about its center longitudinal axis 105 of rotation, operates the valve 104. The stem 106 is rotatable to actuate the valve to an open position and a closed position. For example, the stem 106 can be turned clockwise to open the valve 104, and alternatively, turned counterclockwise to close the valve 104. The stem 106 can only be turned clockwise a specified number of revolutions until the valve 104 reaches a fully open position, at which position the stem 106 cannot be turned clockwise any farther. Likewise, stem 106 can only be turned counterclockwise a specified number of revolutions until the valve 104 reaches a fully closed position, at which position the stem 106 cannot be turned counterclockwise any farther. The stem 106 could be a shank that extends through a gland nut 108 of the valve 104. For simplicity, this disclosure refers the stem 106 as being the portion of the shank that extends upward (i.e., proximally) from the gland nut 108, although, it is understood that an internal portion of the shank is hidden from view by extending downward (i.e., distally) into the body of the valve 104. The stem 106 includes a base 107 and an upper portion, which could have the same or different diameters that each other. For example, the diameter of the base of the stem 106 can be wider than the diameter of the upper portion of the stem 106. Also, the base and upper portion of the stem 106 could have different axial lengths than each other. For example, the axial length of the base of the stem 106 can be shorter than the axial length of the upper portion of the stem 106. The base of the stem 106 includes a differently shaped lateral cross-section than the upper portion of the stem 106. In the example shown, the base of the stem 106 includes a rectangular (for example, square) cross section, and the upper portion of the stem 106 includes a round (for example, circular) cross section. In other gas cylinder valves, the stem could include a lateral cross-section similar to the upper portion of the stem 106. The base of the stem 106 is non-threaded. The upper portion of the stem 106 is threaded, enabling a threaded nut 110 to mechanically fasten to the upper portion of the stem 106. For example, the upper portion of the stem 106 could be threaded at the proximal end tip portion 109 and could be non-threaded at an intermediate portion located between the tip portion 109 and the base of the stem 106. The intermediate portion of the stem 106 enables a handwheel to be attached to the stem 106 between the base of the stem and the tip portion 109, to which the nut 110 is secured. The stem 106 is composed of metal that does not react with acetylene, namely, brass. The stem 106 can be composed of any suitable material that does not react with the gas stored in the cylinder 104.

The threaded nut 110 could be any suitable hardware mechanical fastener. The nut 110 screws onto the upper portion of the stem 106 at the threaded tip portion 109, and cannot be screwed down any farther than the end of the threads of the upper portion of the stem 106.

The safety system 100 includes a coupler 112, a handwheel 114, and a bushing 116. Each component 112, 114, 116 of the safety system 100 is a solid member, for example, the component 112, 114, 116 of the safety system 100 could be a machined metal part, or additive manufactured (also referred to as "3D printed") part composed from an inflexible material. Hard, durable plastic is an example inflexible material from which a component 112, 114, 116 of the safety system 100 can be composed. Each component 112, 114, 116 of the safety system 100 annularly fits onto the stem 106. When installing the safety system 100 onto the stem 106, the coupler 112 slides on first, followed by sliding the handwheel 114, which is followed by sliding the bushing 116. After the bushing 116 has been installed onto the stem 106, the nut 110 screws onto the threaded portion of the stem 106, securely fastening the safety system 100 between the gland nut 108 and the nut 110. The nut 110 prevents the safety system 100 from sliding off the upper portion of the stem 106. More particularly, the nut 110 prevents the safety system 100 sliding out of place, such as sliding upward beyond the non-threaded portions of the stem 106. The details of the coupler 112, a handwheel 114, and a bushing 116 are described more particularly below with reference to FIGS. 2-4.

Figure 2:
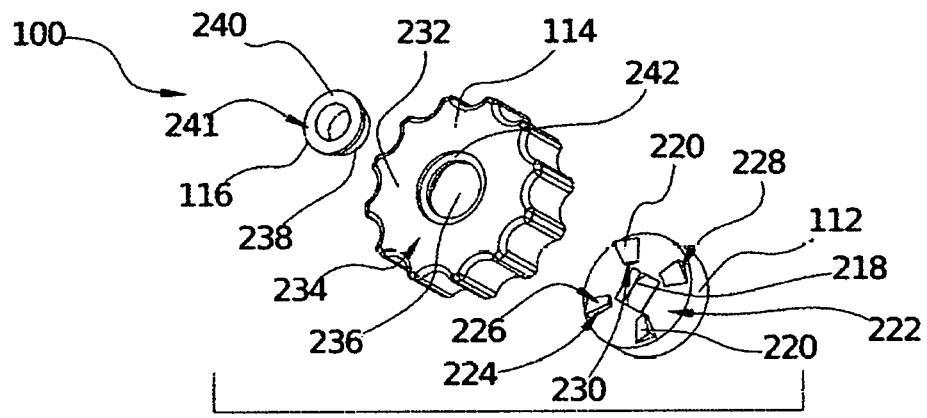
FIGS. 2-3 illustrate an exploded view of the safety system for handwheel-operated gas cylinder valves, according to embodiments of this disclosure.
Figure 3:
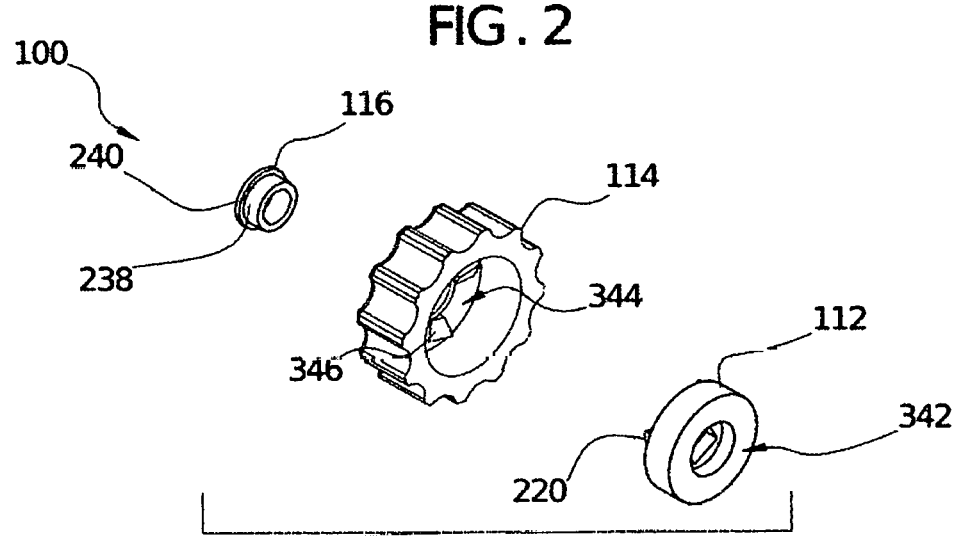

FIGS. 2 and 3 illustrate an exploded view of the safety system 100 for handwheel-operated gas cylinder valves, according to embodiments of this disclosure. FIG. 2 illustrates a top viewpoint of the exploded view of the safety system 100 for handwheel-operated gas cylinder valves, according to embodiments of this disclosure. FIG. 3 illustrates a bottom viewpoint of the exploded view of the safety system 100 for handwheel-operated gas cylinder valves, according to embodiments of this disclosure. As described more particularly below with reference to FIGS. 2 and 3, a first engagement mechanism of the top of the coupler 112 is configured to engage in surface-to-surface contact with a second engagement mechanism of the underside of the handwheel 114, when a user applies both axial pressure and angular forces (i.e., push and turn forces) to handwheel 114. That is, the handwheel 114 locks with respect to the coupler 112 in order cause simultaneous, unitary rotation of the handwheel 114 with the coupler 112. When the coupler 112 is attached to the base of the stem 106, unitary rotation of the handwheel 114 with the coupler 112 causes the stem 106 to rotate in unison with the handwheel 114 and coupler 112. The first engagement mechanism of the top of the coupler 112, together with the second engagement mechanism of the underside of the handwheel 114, form a locking mechanism of the safety system 100.

Referring to FIG. 2, the coupler 112 is a circular cylinder with a hole 218 through its longitudinal center. The annular perimeter of the coupler 112 is smooth, without recesses, protrusions, or lobes. The components of the coupler 112 are integrated as a unitary, solid member.

The hole 218 is dimensioned to annularly fit around the outer perimeter of the base of the stem 106. That is, the dimensions of the hole 218 are larger than the outer perimeter of the base of the stem 106 by only a small tolerance value that both (i) enables the hole 218 to slide onto the stem 106 from tip to base; and (ii) prevents the coupler 112 from rotating independent from the base of the stem 106. The hole 218 has a rectangular shape, which is the same shape as the base of the stem 106. That is, the hole 218 concentrically fits around the outer perimeter of the base of the stem 106. In certain embodiments, the thickness of the coupler 112 matches the axial length of the base of the stem 106.

The coupler 112 further includes a first engagement mechanism, such as multiple lugs 220 that protrude beyond the top planar surface 222 of the coupler 112. In the example shown, the coupler 112 includes four lugs 220, but the coupler 112 can include more or few lugs, namely, any suitable number of lugs. The lugs 220 are spaced equidistant apart, radially around the circumference (i.e., perimeter) of the coupler 112. Each of the lugs 220 includes four or more faces, including a front face 224, a rear face 226, a face that is a radially outward base 228, and a bottom face that is formed by the top planar surface 222 of the coupler 112. Each of the lugs 220 is shaped as a prism. In certain embodiments, each lug 220 as is shaped as a prism with at least one right angle, such as a right trapezoidal prism, or a right triangular prism. One right angle could be formed where the top planar surface 222 of the coupler 112 intersects the front face 224. In the example shown, the each of the lugs 220 is shaped as a right triangular prism, which includes a fifth face, which is a radially inward base 230 located closer to the longitudinal center of the coupler 112 than the outward base 228. The outward base 228 faces opposite the inward base 230. The outward base 228 could be parallel to the inward base 230. Additional right angles are also formed where the top planar surface 222 of the coupler 112 intersects inward base 230 and the outer base 228 of the right triangular prism.

As a circular cylinder, the coupler 112 includes a side surface at its exterior circumference. In the example, shown, the side surface of the coupler 112 are orthogonal to the top planar surface 222 and the bottom surface 342 of the coupler 112. When the coupler 112 is located inside the bore of the handwheel 114, the side surface of the coupler 112 is adjacent to and parallel to the interior surface of the bore of the handwheel 114.

The handwheel 114 is formed as a hollow, lobed cylinder with an open bottom and a closed base 232 at the top. The lobes formed in the side surface of the handwheel 114 enable the fingers of a user (e.g., person) to comfortably grip the sides of the handwheel. As a hollow cylinder, the handwheel 114 includes a bore. The open bottom of the handwheel 114 enables the coupler 112 to be located inside the bore of the handwheel 114, as a consequence of axial movements of the handwheel 114 between a disengaged position and an engaged position. The bore of the handwheel 114 has a circular cylinder shape. The bore of the handwheel 114 could have any suitable shape that both: (i) allows the coupler 112 to enter and exit according to axial movements of the handwheel 114; and (ii) allows the handwheel 114 to rotate annularly around the coupler 112 and independent from the coupler 112 (for example, during an override function described more particularly below).

The closed base 232 of the handwheel 114 includes two opposite surfaces, namely, a top planar surface 234 and an underside planar surface 344 (shown in, and described in detail with reference to FIG. 3). The closed base 232 has a hole 236 through its longitudinal center. The hole 236 is dimensioned to annularly fit around the outer perimeter of the upper portion of the stem 106. That is, the dimensions of the hole 236 could be larger than the perimeter of the upper portion of the stem 106 by only a tolerance value that: (i) enables the hole 236 to slide onto the stem 106 from at the tip and slide farther along the intermediate portion of the stem 106 to a disengaged position; and (ii) allows the sleeve of the bushing 116 to fit annularly around the upper portion of the stem 106 and while the surface of the hole 236 annularly surrounds the sleeve of the bushing 116; and (iii) allows the handwheel 114 to rotate independent from the combination of the stem 106 and sleeve of the bushing 116. The lateral cross section of the hole 236 has the same shape as the upper portion of the stem 106, for example, a circle. That is, the hole 236 concentrically fits around the outer perimeter of the upper portion of the stem 106. In the embodiment shown, the hole 236 is larger than the upper portion of the stem 106 such that the handwheel 114 could tilt about the stem 106 or could loosely misalign from the longitudinal center of the stem 106. In order to mitigate or prevent the possibility of the handwheel 114 tilting about or misaligning from the stem 106, the shape of the hole 236 of the handwheel 114 matches the shape of the exterior of the bushing 116, so that the bushing 116 can mate with the hole 236 of the handwheel 114. In the embodiment shown, the bushing 116 includes a flange 240 and a sleeve 238, accordingly, the hole 236 of the handwheel includes multiple (e.g., two) portions with respective diameters. The hole 236 of the handwheel includes an upper portion that has an outer diameter that matches the size and shape of the perimeter of the flange 240 of the bushing 116, and the hole 236 of the handwheel includes a lower portion that has a smaller, inner diameter that matches the size and shape of the perimeter of the sleeve 238 of the bushing 116.

The handwheel 114 includes a recessed lip 242 that prevents the handwheel 114 from siding off the upper portion of the stem 106 by abutting with the flange 240 of the bushing 116 when the handwheel 114 is forced to move longitudinally toward the tip of the stem 106. The recessed lip 242 extends between the inner and outer diameters of the hole 236. That is, the recessed lip 242 extends radially inward from the surface of the upper portion of the hole 236 by a distance such as the difference between the inner and outer diameters of the hole 236. The recessed lip 242 mates with the flange 240 of the bushing 116 such that the top surface 241 of the bushing 116 is flush with the top planar surface 234 of the handwheel 114.

The bushing 116 can be a flanged bushing that includes a sleeve 238 and a flange 240. The flange 240 extends radially outward from the sleeve 238 of the bushing 116. In embodiments in which the inner diameter of the hole 236 of the handwheel 114 is larger than the diameter of the nut 110, the bushing 116 prevents the prevents the handwheel 114 from sliding off the upper portion of the stem 106.

In other embodiments of this disclosure, the hole of the handwheel 114 could be dimensioned such that no bushing 116 is necessary, and the safety system 100 includes only the coupler 112 and a handwheel. As such, the nut 110 prevents the handwheel 114 from sliding off the upper portion of the stem 106 by abutting the handwheel 114. In order to mitigate or prevent the possibility of the handwheel 114 tilting about or misaligning from the stem 106, the shape of the hole 236 of the handwheel 114 matches the shape of the upper portion of the stem 106. The clearance space between the interior surface of the hole 236 and the exterior surface of the stem 106 has a size that: (i) enables the hole 236 of the handwheel to slide onto the stem 106 at the tip and slide farther along the intermediate portion of the stem 106 to the disengaged position; and (ii) allows the handwheel 114 to rotate independent from the stem 106.

Referring to FIG. 3, the bottom surface 342 of the coupler 112 is a planar (i.e., flat) surface. In certain embodiments, as shown in FIG. 3, the hole 218 has an upper portion and a lower portion that have different shapes from each other, such that the upper portion of the hole 218 has a rectangular shape, and the lower portion of the hole 218 has a circular shape. The differently shaped portions of the hole 218 match the shape of the base of the stem 106 and are dimensioned to annularly fit around the base of the stem 106. In other embodiments, the base of the stem 106 may have a uniform shape, and the hole of the coupler has a uniform shape from top to bottom, such as a rectangular shape throughout (as shown in FIG. 7).

The handwheel 114 includes a second engagement mechanism, such as multiple lugs 346 that protrude beyond the underside planar surface 344 of the closed base 232 of the handwheel 114. In the example shown, the handwheel 114 includes four lugs 346, but the handwheel 114 can include any suitable number of lugs. The lugs 346 of the handwheel 114 can be the same as or similar to the lugs 220 of the coupler 112. For example, the front face 224, rear face 226, radially outward base 228, bottom face formed by the top planar surface 222, radially inward base 230, and other features of the lugs 220 of the coupler 112 in FIG. 2 could be the same as or similar to the analogously corresponding front face 724, rear face 726, radially outward base, top face formed by underside planar surface 344, radially inward base 730, and other features of the lugs 346 of the handwheel 114, which are more visible in FIG. 7. As another example, a right angle could be formed where the front face 724 of the handwheel intersects the underside planar surface 344, or could be formed where the rear face 726 of the handwheel intersects the underside planar surface 344, or both.

Figure 4:
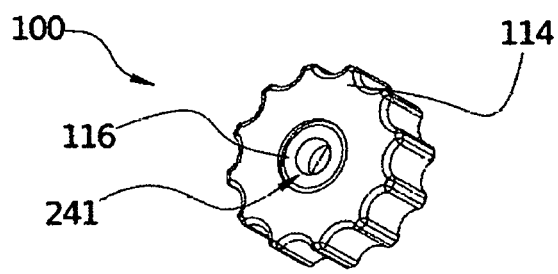
FIG. 4 illustrates a fully assembled view of the safety system for handwheel-operated gas cylinder valves of FIGS. 2-3.

FIG. 4 illustrates a fully assembled view of the safety system 100 for handwheel-operated gas cylinder valves of FIGS. 2-3. The bushing 116 is located on top of the recessed lip 242 of the handwheel 114, such that the top surface 241 of the bushing 116 is flush (e.g., coplanar) with the top planar surface 234 of the handwheel 114. The coupler 112 is hidden from view, as the coupler 112 is located inside the bore of the handwheel 114.

Once installed onto the valve stem 106, the top surface 241 of the bushing 116 may separate (e.g., become non-coplanar) from top planar surface 234 of the handwheel 114, depending on how far down the stem 106 the bushing 116 is installed, and depending on how far down the stem 106 the handwheel 114 has slid, and depending on the length of the stem 106.

Although FIGS. 2-4 illustrate one example of a safety system 100 for handwheel-operated gas cylinder valves, various changes may be made to FIGS. 2-4. For example, the relative sizes, shapes, and dimensions of the various components shown in FIGS. 2-4 are for illustration only. Each component in FIGS. 2-4 could have any other size, shape, and dimensions. As another example, the top planar surface 222 of the coupler 112 could intersect the faces of the lugs 220 in a non-orthogonal manner, namely, at an angle other than a right angle (e.g., ninety degrees (90°)). As another example, the lugs 220 could be spaced apart, around the circumference of the coupler 112 in a non-equidistant manner.

FIG. 5 illustrates a fully assembled view of the safety system 100 for handwheel-operated gas cylinder valves and the gas cylinder 102 of FIG. 1. FIG. 6 illustrates a detailed view of fully assembled view of the safety system for gas cylinder valves and the gas cylinder of FIG. 5.

As shown in FIGS. 5 and 6, the safety system 100 is installed onto the stem 106 of the valve 104. In order to open the valve 104, the stem 106 of the valve 104 must be forced to rotate in a valve opening direction 502, such as clockwise. In order to close the valve 104, the stem 106 of the valve 104 must be forced to rotate in a valve closing direction 602, such as counterclockwise. The valve opening direction 502 and the valve closing direction 602 also indicate a lateral plane in which an angular force of rotation is applied to the handwheel 114 (e.g., at the lobes).

Figure 7A:
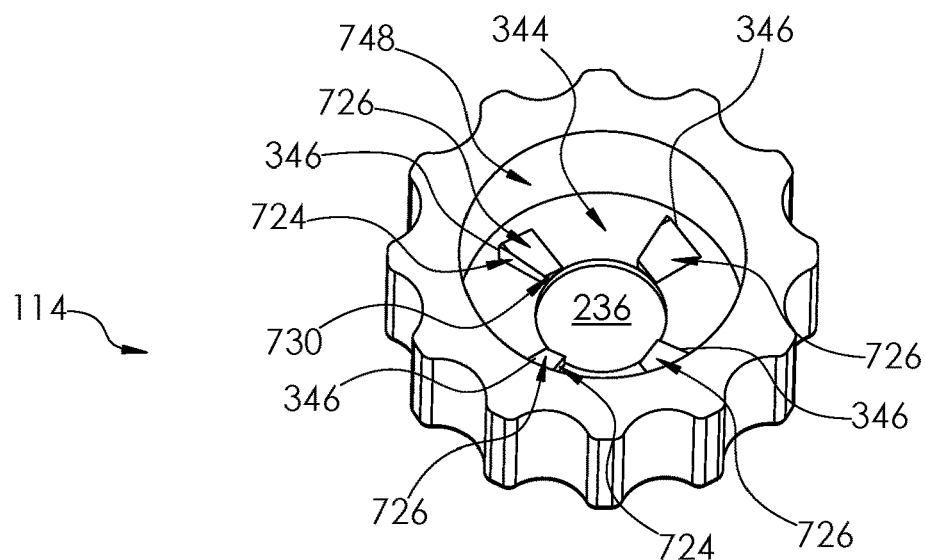
FIG. 7A illustrates a bottom view of the handwheel of FIG. 1.
Figure 7B:
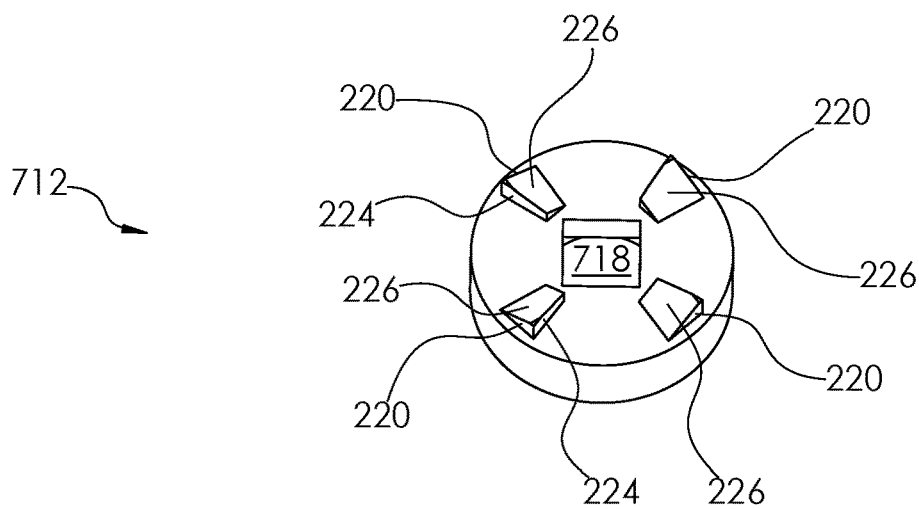
FIG. 7B illustrates a top view of another embodiment of a coupler of a safety system for handwheel-operated gas cylinder valves, according to embodiments of this disclosure.

Together, FIGS. 7A and 7B are referred to as FIG. 7. FIG. 7A illustrates a bottom view of the handwheel 114 of FIG. 1, and FIG. 7B illustrates a top view of another embodiment of a coupler 712 of a safety system for handwheel-operated gas cylinder valves, according to embodiments of this disclosure. Accordingly, the interior surface 748 of the bore of the handwheel 114 is more visible. Also, the underside planar surface 344 of the closed base 232 of the handwheel 114 is fully visible.

Note that while two couplers 112 and 712 are described in this disclosure, features of one coupler 112 could be used in the other coupler 712. The only difference between these two couplers 112 and 712 is that the hole 218 of the coupler 112 of FIGS. 1-6 has differently shaped upper and lower portions of the hole 218; yet the hole 718 of the coupler 712 of FIG. 7B has a uniform shape (e.g., square) from top to bottom. For instance, the coupler 712 includes a first engagement mechanism, such as the multiple lugs 220 that protrude beyond the top planar surface of the coupler. The safety system 100 could operate using the coupler 712 in exchange for the coupler 112.

Although FIG. 7 illustrates one example of a handwheel 114 and coupler 712 of a safety system for handwheel-operated gas cylinder valves, various changes may be made to FIG. 7. For example, the relative sizes, shapes, and dimensions of the various components shown in FIG. 7 are for illustration only. Each component in FIG. 7 could have any other size, shape, and dimensions.

Figure 8:
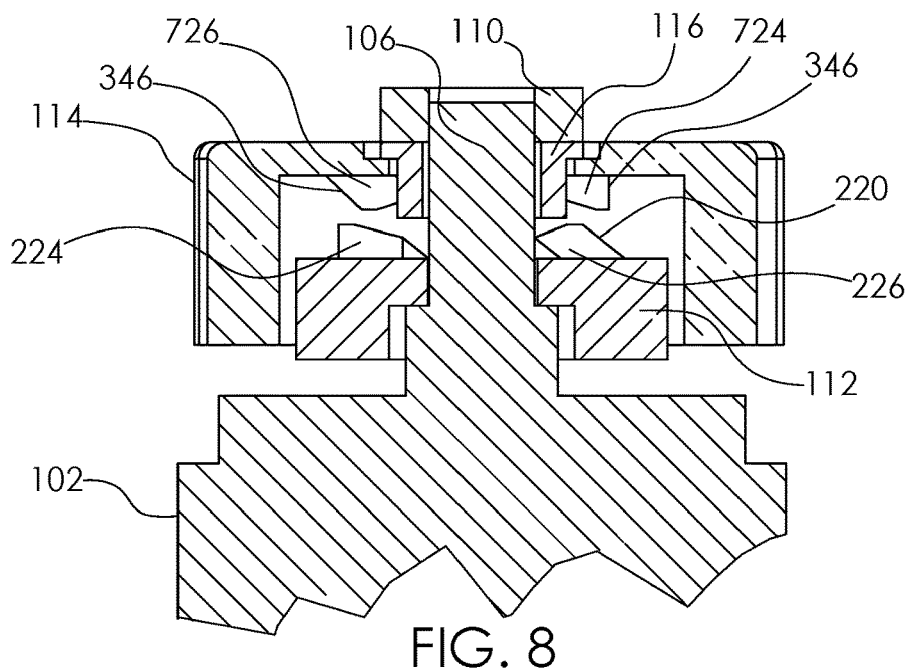
FIG. 8 illustrates a cross section view of the safety system for handwheel-operated gas cylinder valves in a disengaged position, according to embodiments of this disclosure.

FIG. 8 illustrates a cross section view of the safety system 100 for handwheel-operated gas cylinder valves in a disengaged position, according to embodiments of this disclosure. In the disengaged position, the handwheel 114 can rotate about the stem 106 independent from or relative to the coupler 112 without causing rotation of the stem 106, thereby also without effectuating an opening or closing of the valve 104.

The top surfaces of the bushing 116 and the closed base 232 of the handwheel 114 are flush with each other, as the flange 240 of the bushing 116 is in physical contact with the recessed lip 242 of the handwheel 114. The lugs 346 of the handwheel 114 to are located above the lugs 220 of the coupler 112 and do not occupy the same lateral plane occupied by the lugs 220 of the coupler 112. For example, the tugs 346 and 220 could be separated axially by the axial depression length. Similarly, a portion of the coupler 112 located outside the bore of the handwheel 114, as the bottom surface 342 of the coupler 112 is located (distally) below the bottom of the open bottom of the handwheel 114 by a distance that is the axial depression length or greater. The top planar surface 222 of the coupler 112 is not in contact with any of the lugs 346 of the handwheel 114.

Figure 9:
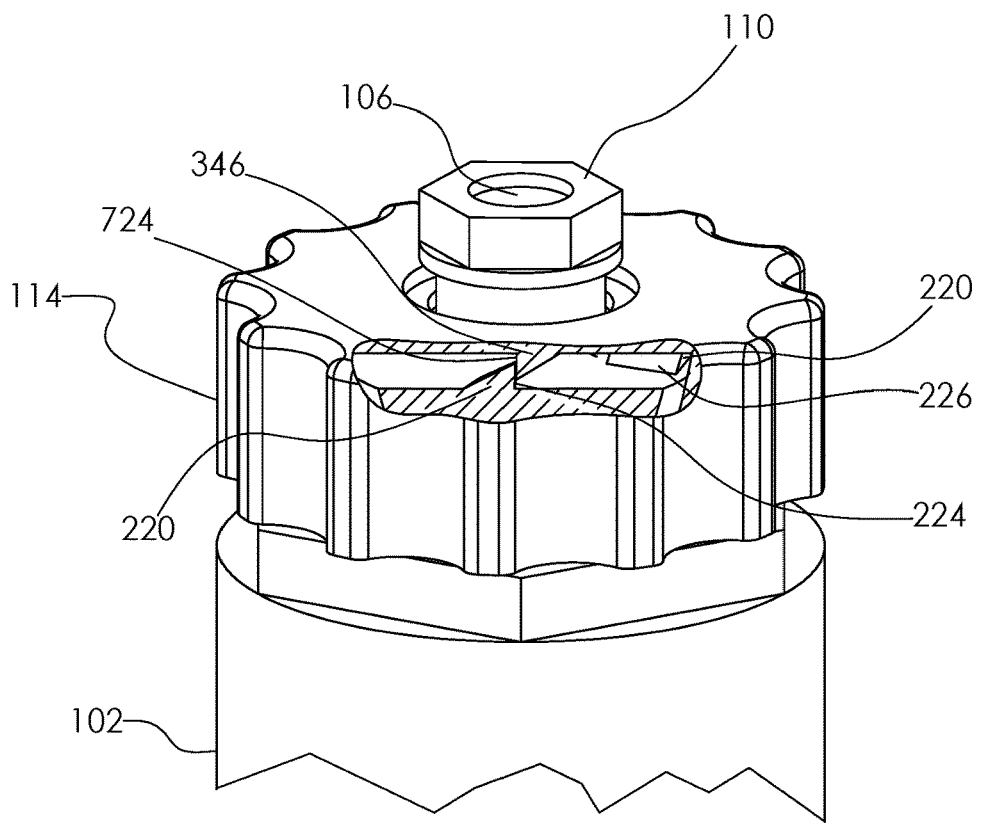
FIG. 9 illustrates a cutout view of the safety system for handwheel-operated gas cylinder valves in an engaged position, according to embodiments of this disclosure.

FIG. 9 illustrates a cutout view of the safety system 100 for handwheel-operated gas cylinder valves in an engaged position, according to embodiments of this disclosure. The safety system 100 is in the engaged position when a downward axial pressure is applied to the handwheel 114 in combination with an angular force of rotation being applied to the handwheel 114 in a lateral plane. In the engaged position, the handwheel 114 rotates about the stem 106 in unison with the coupler 112, causing rotation of the stem 106, thereby also effectuating an opening or closing of the valve 104.

The top surfaces of the blushing 116 and the closed base of the handwheel 114 are is distally separated from each other by the axial depression length. The sleeve 238 of the bushing 116 remains in the hole 236 of the handwheel 114, while the flange 240 of the bushing 116 is not in physical contact with the recessed lip 242 of the handwheel 114. The lugs 346 of the handwheel 114 occupy the same lateral plane occupied by the lugs 220 of the coupler 112. As such, the combination of axial pressure and angular force of rotation causes the lugs 346 of the handwheel 114 be in surface-to-surface contact with the lugs 220 of the coupler 112. In the example shown, when the handwheel 114 is rotated clockwise, the front faces 724 of the lugs 346 of the handwheel 114 engage in surface-to-surface contact with the front faces 224 of the lugs 220 of the coupler; and when the handwheel 114 is rotated counterclockwise, the rear faces 726 of the lugs 346 of the handwheel 114 engage in surface-to-surface contact with the rear faces 226 of the lugs 220 of the coupler 112. As shown in FIG. 9, the front face 224 of the lugs 220 of the coupler 112 are engaged in surface-to-surface contact with the front face 724 of the tugs 346 of the handwheel 114. In some implementations of the engaged position, the lugs 346 of the handwheel 114 are in physical contact with the top planar surface 222 of the coupler 112. The coupler 112 is partially hidden from view. More particularly, the whole coupler 112 is located inside the bore of the handwheel 114, and the bottom surface 342 of the coupler 112 is located (distally) at or above the bottom of the open bottom of the handwheel 114.

Figure 10:
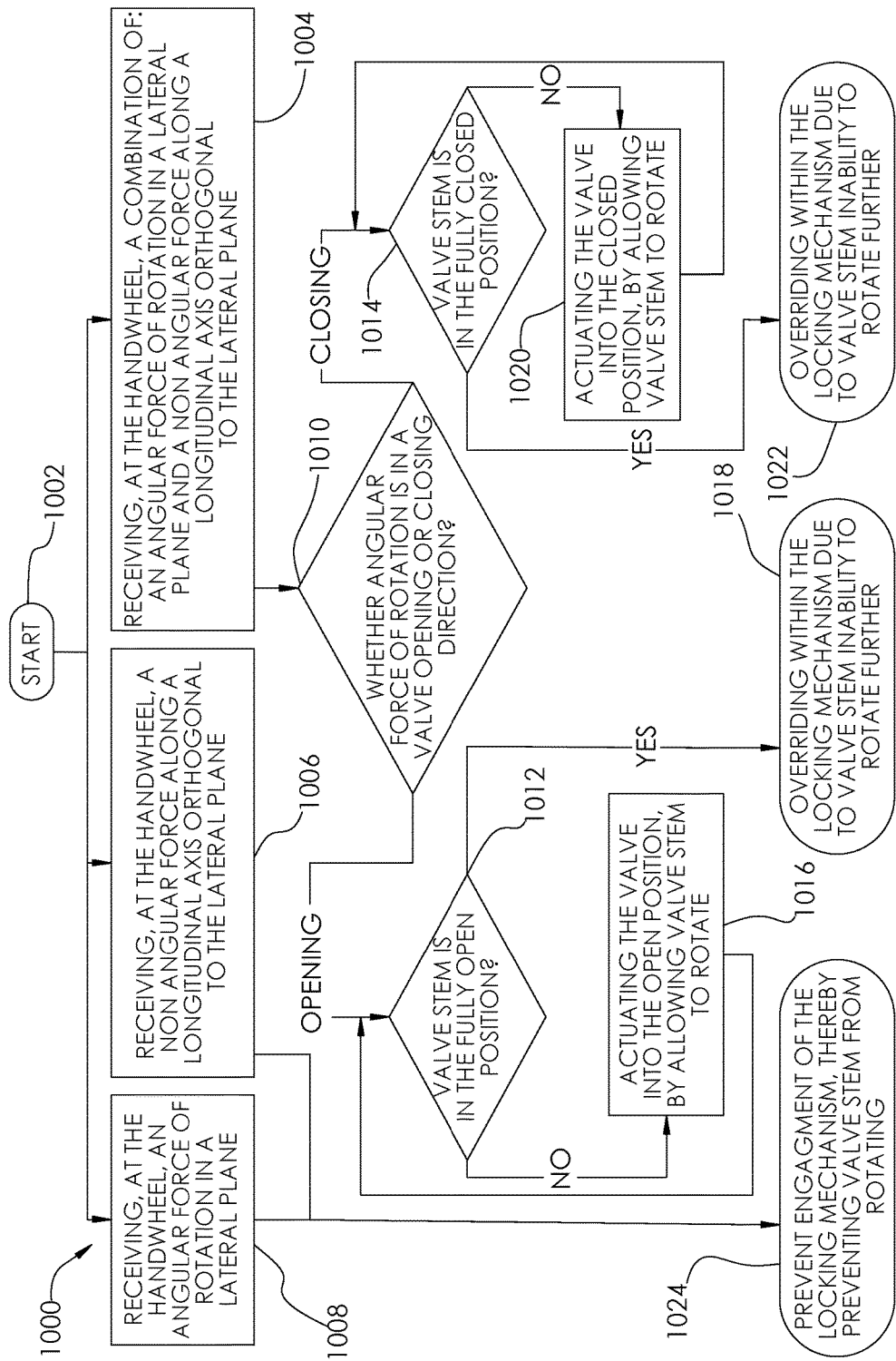
FIG. 10 illustrates a process of operating the safety system for handwheel-operated gas cylinder valves, according to embodiments of this disclosure.

FIG. 10 illustrates a process 1000 of operating the safety system 100 for handwheel-operated gas cylinder valves, according to embodiments of this disclosure. The example process shown in FIG. 10 may include additional or different operations, and the operations can be performed in the order shown or in another order. In some implementations, the process 1000 can be performed by a safety system for handwheel-operated gas cylinder valves, such as the safety system 100 of FIGS. 1-6. In some implementations, the process 1000 can be performed by another type of system that includes similar or different components. For simplicity, the process 1000 will be described as being performed by the safety system 100. In some implementations, the process 1000 could be incorporated into a method of operating a gas cylinder valve 104.

The process 1000 begins at the start block 1002, which includes providing the safety system 100, and installing the safety system 100 onto a stem 106 of a gas cylinder valve 104. As an example, providing the safety system 100 could include manufacturing the coupler 112, the handwheel 114, and the bushing 116 by using an additive manufacturing process or by using a machining metal process. As an example, installing the safety system 100 onto the stem 106 could include mounting the coupler 112 onto the base 107 of the stem 106 and mounting the handwheel 114 onto an intermediate portion of the stem 106 between the tip portion 109 and a top planar surface 222 of the coupler. As a further example, installation of the safety system 100 could include: (i) attaching the bushing 116 to the stem 106 at a location between the tip portion 109 of the stem 106 and the top planar surface 234 of the handwheel 114, and (ii) mechanically fastening a nut 110 onto the tip portion 109 of the stem 106. Once the safety system 100 provided and installed, the process 1000 proceeds to either block 1004, 1006, or 1008, depending on which force or combination of forces a user applies to the handwheel 114.

In block 1004, the locking mechanism of the safety system 100 engages when the handwheel 114 receives a combination of: (i) an angular force of rotation in a lateral plane, and (ii) a non-angular force along a longitudinal axis 105 orthogonal to the lateral plane. More particularly, in block 1004, the user grips the handwheel 114 and applies the combination of forces to the handwheel 114, thereby turning and pushing the handwheel 114 such that the locking mechanism of the safety system 100 engages.

In order to operate the valve 104, the user must apply sufficient axial pressure to the handwheel 114 to push the handwheel 114 down the stem 106 (i.e., distally) by a specified axial depression length, namely, the distance between the disengaged position and engaged position of the safety system 100. The user, by moving the handwheel 114, also moves the lugs 346 of the handwheel to occupy a same lateral plane occupied by the lugs 220 of the coupler 112, for example, the lugs 346 of the handwheel could move into physical contact with the top planar surface 222 of the coupler 112. For example, the specified axial depression length could be the same as or based on the height of the lug 220 above (e.g., protruding proximally beyond) the top planar surface 222 of the coupler 112, and could be additionally based on a clearance height that enable the lugs 346 of the handwheel 114 to bypass the lugs 220 of the coupler 112. In the example coupler 112, the height of the front face 224 defines the height of the lug 220 above the top planar surface 222.

Additionally, in order to operate the valve 104, the user must rotate the handwheel 114 about the longitudinal axis 105, while pushing the handwheel 114 down the stem 106 by the specified axial depression length. The user, by applying the angular force of rotation to the handwheel 114, rotates the lugs 346 of the handwheel 114 to engage into surface-to-surface contact with the lugs 220 of the coupler 112, such that the lugs 346 of the handwheel 114 apply a portion of the angular force of rotation (i.e., torque) against the lugs 220 of the coupler 112. Depending on the direction of the angular rotation and depending on whether the valve 104 is fully open or fully closed, the valve stem 106 rotates in unison with the rotation of the handwheel 112 while the lugs 220 of the coupler 112 are engaged in surface-to-surface contact with corresponding lugs 346 of the handwheel 114. In certain implementations of the safety system 100, the front face 224 of each lug 220 of the coupler 112 is configured to engage in surface-to-surface contact with the rear face 726 of a corresponding lug 346 of the handwheel 114, when the user pushes-down and turns the handwheel 114 in the clockwise direction. The rear face 226 of each lug 220 of the coupler 112 is configured to engage in surface-to-surface contact with the front face 724 of a corresponding lug 346 of the handwheel 114, when a user pushes and turns the handwheel 114 down and in the counterclockwise direction, respectively. In other implementations of the safety system 100, the coupler 112 could be configured for clockwise rotation while the rear face 226 of the lugs 220 of the coupler 112 are engaged in contact with the rear face 726 of the lugs 346 of the handwheel 114; and the coupler 112 could be configured for counterclockwise rotation while the front face 224 of the lugs 220 of the coupler 112 are engaged in contact with the front face 724 of the lugs 346 of the handwheel 114.

In block 1010, the handwheel 114, in response to receiving the combination of forces described with reference to block 1004, rotates about the longitudinal axis 105 in the direction of in the direction of the angular force. More particularly, in block 1010, if the angular force of rotation is applied in a valve opening direction 502, then the process 1000 proceeds to block 1012. Alternatively, in block 1010, if the angular force of rotation is applied in a valve closing direction 602, then the process 1000 proceeds to block 1014.

In block 1012, if the valve 104 (including valve stem 106) is not in the fully open position, then the process 1000 proceeds to block 1016, in which the safety system 100 actuates the valve 104 into the open position by allowing the valve stem 106 to rotate in unison with the handwheel 114. More particularly, the valve stem 106 to rotates in unison with rotation of the coupler 112, and when the locking mechanism of the safety system 100 is engaged, the coupler 112 rotates in unison with the handwheel 114, thereby also causing the valve stem 106 to rotate in unison with the handwheel 114. In certain valves 104, the stem 106 could be very easy to turn, requiring the slightest torque (known colloquially as hair trigger pressure). Once the stem 106 has been rotated to the position where the valve 104 is in the fully open position, the stem 106 cannot be rotated in the valve opening direction 502 (i.e., clockwise) any farther, and consequently also the coupler 112 (which is attached to the base of the stem 106) cannot be rotated clockwise any farther. In block 1012, if the valve 104 is in the fully open position, then the process 1000 proceeds to block 1018, in which an override function of the locking mechanism of the safety system 100 occurs in the valve opening direction.

In block 1018, while the valve 104 is fully open, if the user continues to apply the combination of axial pressure and clockwise angular forces (i.e., combination of engaging forces) to handwheel 114, then the lugs 346 of the handwheel 114 will override (for example, cam over, bump over, or click over) the lugs of the coupler 112. During the override of block 1018, the handwheel 114 rotates clockwise relative to the coupler 112, and consequently also the handwheel 114 rotates clockwise relative to the stem 106. That is, rotation of the handwheel 114 relative to the coupler 112 means that the handwheel 114 rotates independently while the coupler 112 and stem 106 remain stationary.

Blocks 1014, 1018, and 1020, which relate to the valve closing direction (counterclockwise) and fully closed position, are analogous to blocks 1012, 1016, and 1018, which relate to the valve opening direction (clockwise) and fully open position. In block 1014, if the valve 104 (including valve stem 106) is not in the fully closed position, then the process 1000 proceeds to block 1020, in which the safety system 100 actuates the valve 104 into the closed position by allowing the valve stem 106 to rotate in unison with the handwheel 114. Once the stem 106 has been rotated to the position where the valve 104 is in the fully closed position, the stem 106 cannot be rotated counterclockwise any farther, and consequently also the coupler 112 (which is attached to the base of the stem 106) cannot be rotated counterclockwise any farther. In block 1014, if the valve 104 is in the fully closed position, then the process 1000 proceeds to block 1022, in which an override function of the locking mechanism of the safety system 100 occurs in the valve closing direction.

In block 1022, while the valve 104 is fully closed, if the user continues to apply axial pressure and counterclockwise angular forces (i.e., push and counterclockwise turning forces) to handwheel 114, then the lugs 346 of the handwheel 114 will override the lugs of the coupler 112 so that the handwheel 114 rotates counterclockwise relative to the coupler 112, and consequently also the handwheel 114 rotates counterclockwise relative to the stem 106.

In block 1004, 1016, 1020, 1018, or 1022, if the user ceases to apply axial pressure to the handwheel 114, the handwheel 114 automatically (i.e., without user intervention) separates from the coupler 112 such that lugs of the handwheel 114 are elevated above the lugs of the coupler 112 such that the lugs of the handwheel 114 do not occupy the same lateral plane. If the user ceases to apply axial pressure, but instead applies angular forces (for example, counterclockwise or clockwise turning forces without pushing) then the handwheel 114 rotates in the direction of the angular force, yet the lugs of the handwheel 114 bypass the lugs of the coupler 112. Bypassing can include the handwheel 114 free spinning above the lugs of the coupler 112 without the surface-to-surface contact of overriding of the lugs of the coupler 112.

In block 1006, the handwheel 114 receives a non-angular force along the longitudinal axis 105, but does not receive an angular force or rotation in a lateral plane that is orthogonal to the longitudinal axis 105. The process 1000 proceeds to block 1024, wherein safety system 100 prevents or ceases engagement of the locking mechanism. More particularly, in block 1006, the user grips the handwheel 114 and applies axial pressure (i.e., the non-angular force) to the handwheel 114, thereby pushing the handwheel 114 toward the coupler 112 by an amount that is less than or equal to the specified axial depression length.

In block 1008, the handwheel 114 receives an angular force of rotation in a lateral plane that is orthogonal to the longitudinal axis 105, but does not receive a non-angular force along the longitudinal axis 105. The handwheel 114, in response to receiving the angular force of rotation in the lateral plane, rotates about the longitudinal axis 105 in the direction of the angular force (clockwise or counterclockwise), yet the lugs 346 of the handwheel 114 bypass the lugs 220 of the coupler 112. The rotation of the handwheel 114 is independent from the coupler 112 when the locking mechanism is disengaged. The process 1000 proceeds to block 1024, wherein safety system 100 prevents or ceases engagement of the locking mechanism. More particularly, in block 1008, the user grips the handwheel 114 and applies a rotational force (i.e., the angular force of rotation or torque) to the handwheel 114, thereby turning the handwheel 114 in the direction of the angular force, which could be a clockwise or counterclockwise direction.

In block 1024, the locking mechanism of the safety system 100 is prevented from engagement, which thereby prevents the valve stem 106 from rotating to actuate the valve 104. Without receiving the angular force of rotation in combination with the received non-angular force as described above with reference to block 1004, the handwheel 114 prevents engagement of the locking mechanism of the safety system 100 or disengages the locking mechanism by separating the handwheel 114 from the coupler 112 such that lugs of the handwheel 114 are elevated above the lugs of the coupler 112 such that the lugs of the handwheel 114 do not occupy the same lateral plane. Likewise, without receiving the non-angular force or axial pressure in combination with the received angular force as described above with reference to block 1004, the handwheel 114 prevents engagement of the locking mechanism of the safety system 100 or disengages the locking mechanism by separating faces of the lugs 346 of the handwheel 114 away from being in surface-to-surface contact with adjacent faces of the lugs 220 of the coupler 112. Without applying the combination of angular and non-angular forces described above with reference to block 1004, the user fails to engage or causes disengagement of the locking mechanism of the safety system 100, and thereby also fails to actuate the valve 104.

In certain implementations of the first embodiment of this disclosure, the stem is configured to: rotate in a valve opening direction to actuate the valve to the open position; stop rotating in the valve opening direction when the valve is fully opened, thereby remaining stationary; rotate in a valve closing direction to actuate the valve to the closed position; and stop rotating in the valve closing direction when the valve is fully closed, thereby remaining stationary. The angular direction of the angular force includes a valve opening direction or a valve closing direction. The handwheel is further configured to override the locking mechanism by: when the valve is fully opened or fully closed, in response to receiving the combination of: (i) the angular force of rotation in the valve opening direction or the valve closing direction, respectively, and (ii) the non-angular force, rotating independent from the stationary coupler, in the valve opening direction or the valve closing direction, respectively, by forcing the second engagement mechanism to override the first engagement mechanism in surface-to-surface contact.

In certain implementations of this disclosure, the first engagement mechanism of the coupler includes multiple first lugs that protrude proximally beyond the top surface of the coupler. The second engagement mechanism of the handwheel includes multiple second lugs that protrude distally beyond a distal, underside surface of the handwheel. The locking mechanism configured to be engaged by a combination of: (i) the non-angular force moving the second lugs distally to occupy a same lateral plane occupied by the first lugs, and (ii) the angular force of rotation rotating the second lugs to apply a portion of the angular force of rotation against the first lugs. Each of the first lugs includes a prism with at least one right angle formed where the top surface of the coupler intersects a front face of the prism. Each of the second lugs comprise a prism identical to the prisms of each of the first lugs. The second lugs are configured to apply the portion of the angular force of rotation against the first lugs at an interface between the front face of the first lugs and an adjacent face of the prisms of the second lugs. The first lugs are spaced equidistantly around a perimeter of the top surface of the coupler. The second lugs are spaced equidistantly around a perimeter of the underside surface of the handwheel.

In certain implementations of this disclosure, the handwheel is formed as a hollow, lobed cylinder that includes: a bore, a distal open bottom, and a closed base. The distal open bottom is configured to enable the coupler to be located inside the bore, as a consequence of axial movements of the handwheel between a disengaged position and an engaged position. The closed base includes a proximal top surface of the handwheel. The proximal top surface of the handwheel includes a hole configured to restrict the handwheel from tilting about the valve stem. The hole of the proximal top surface of the handwheel has a shape that matches a shape of the intermediate portion of the stem. The hole of the proximal top surface of the handwheel has dimensions configured to provide a clearance space between an interior surface of the hole of the handwheel and an exterior surface of the stem. The clearance space has a size that: (i) enables the hole of the handwheel to slide onto the stem at the tip portion and slide distally along the intermediate portion of the stem, and (ii) allows the handwheel to rotate independent from the stem when the locking mechanism is disengaged.

In certain implementations of this disclosure, the safety system additionally includes a bushing configured to: mount onto the stem between the tip portion and a proximal top surface of the handwheel; fit within a hole through the top surface of the handwheel and annularly around the stem such that the bushing rotates or remains stationary in unison with the stem; limit the handwheel from moving proximally beyond the bushing; and limit the handwheel from tilting about the stem.

According to various implementations of this disclosure, at least one of the handwheel or the coupler is composed of plastic. According to various implementations of this disclosure, at least one of the handwheel or the coupler includes an additive manufactured part. According to various implementations of this disclosure, at least one of the handwheel or the coupler includes a machined metal part composed of brass. According to various implementations of this disclosure, the valve includes a low-pressure acetylene gas cylinder valve.

In certain implementations of this disclosure, the coupler includes a hole dimensioned to annularly fit around an outer perimeter of the base of the stem. In one example, the base of the stem includes a uniform rectangular shaped lateral cross-section, the intermediate portion of the stem includes a round shaped lateral cross-section, and the hole of the coupler includes a rectangular shaped lateral cross-section similar to the lateral cross-section of the base of the stem. In another example, the hole of the coupler includes a proximal upper portion having a rectangular shaped lateral cross-section a distal lower portion having a round shaped lateral cross-section.

In certain implementations of the second embodiment, the method further includes overriding the locking mechanism by: when the valve is fully opened or fully closed, in response to receiving the combination of: (i) the angular force of rotation in a valve opening direction or a valve closing direction, respectively, and (ii) the non-angular force, rotating the handwheel independent from the coupler, in the valve opening direction or the valve closing direction, respectively, by forcing the second engagement mechanism to override the first engagement mechanism in surface-to-surface contact. The coupler remains stationary in unison with the stem.

What is claimed is:

1. A handwheel for a safety system for a gas cylinder valve stem, the stem being rotatable to actuate a valve to an open position and a closed position, the stem having a proximal end tip portion, a distal end base, and a center longitudinal axis of rotation, the safety system including a coupler that includes a first engagement mechanism, the coupler being mountable onto the base of the stem and able to rotate the stem in unison with rotation of the coupler or remain stationary in unison with the stem while the stem is stationary, the handwheel comprising:
  a second engagement mechanism of a locking mechanism defined by the first and second engagement mechanisms, the second engagement mechanism configured to engage in surface-to-surface contact with the first engagement mechanism such that the handwheel transfers torque to the coupler, wherein the handwheel is configured to:
    mount onto an intermediate portion of the stem between the tip portion and a top surface of the coupler;
    rotate about the longitudinal axis, in response to receiving an angular force of rotation in a lateral plane, wherein the rotation of the handwheel is in unison with the coupler when the locking mechanism is engaged, and wherein the rotation of the handwheel is independent from the coupler when the locking mechanism is disengaged; and
    disengage of the locking mechanism, in two alternative ways:
      in response to receiving the angular force of rotation in the lateral plane; or
      in response to receiving a non-angular force in a proximal direction along the longitudinal axis, wherein the longitudinal axis is orthogonal to the lateral plane.

2. A safety system for a gas cylinder valve stem, the stem being rotatable to actuate a valve to an open position and a closed position, the stem having a proximal end tip portion, a distal end base, and a center longitudinal axis of rotation, the safety system comprising:
  a coupler including a first engagement mechanism, the coupler configured to
    mount onto the base of the stem, and
    to rotate the stem in unison with rotation of the coupler or remain stationary in unison with the stem while the stem is stationary; and
  a handwheel including a second engagement mechanism of a locking mechanism defined by the first and second engagement mechanisms, the second engagement mechanism configured to engage in surface-to-surface contact with the first engagement mechanism such that the handwheel transfers torque to the coupler, wherein the handwheel is configured to:
    mount onto an intermediate portion of the stem between the tip portion and a top surface of the coupler;
    rotate about the longitudinal axis, in response to receiving an angular force of rotation in a lateral plane, wherein the rotation of the handwheel is in unison with the coupler when the locking mechanism is engaged, and wherein the rotation of the handwheel is independent from the coupler when the locking mechanism is disengaged; and disengage the locking mechanism, in two alternative ways:
in response to receiving the angular force of rotation in the lateral plane; or
in response to receiving a non-angular force in a proximal direction along the longitudinal axis, wherein the longitudinal axis is orthogonal to the lateral plane.

3. The safety system of claim 2, wherein the handwheel is further configured to:
engage the locking mechanism, in response to receiving a combination of:
the angular force of rotation in the lateral plane occupied by the first and second engagement mechanisms, and
a non-angular force distally along the longitudinal axis; and
rotate about the longitudinal axis in unison with the coupler and in a direction of the angular force when the locking mechanism is engaged, thereby also rotating the stem in unison with the handwheel and the coupler.

4. The safety system of claim 3, wherein the stem is configured to:
rotate in a valve opening direction to actuate the valve to the open position,
stop rotating in the valve opening direction when the valve is fully opened, thereby remaining stationary,
rotate in a valve closing direction to actuate the valve to the closed position, and
stop rotating in the valve closing direction when the valve is fully closed, thereby remaining stationary;
wherein the direction of the angular force in the lateral plane occupied by the first and second engagement mechanisms includes the valve opening direction or the valve closing direction; and
wherein the handwheel is further configured to override the locking mechanism:
when the valve is fully opened or fully closed, in response to receiving the combination of:
the angular force of rotation in the valve opening direction or the valve closing direction, respectively, and
the non-angular force distally along the longitudinal axis; and
by rotating independent from the stationary coupler, in the valve opening direction or the valve closing direction, respectively, by forcing the second engagement mechanism to override the first engagement mechanism in surface-to-surface contact.

5. The safety system of claim 4, wherein each of the first and second engagement mechanisms is a prism that includes a rear face that is inclined relative to the top surface of the coupler or an underside planar surface of the handwheel, respectively; and
wherein the handwheel is further configured to override the locking mechanism by, camming the rear face of the second engagement mechanism over the rear face of the first engagement mechanism,
when the direction of the angular force of rotation is the valve opening direction in the lateral plane occupied by the first and second engagement mechanisms.

6. The safety system of claim 3,
wherein the first engagement mechanism of the coupler comprises multiple first lugs that protrude proximally beyond the top surface of the coupler; and wherein the second engagement mechanism of the handwheel comprises multiple second lugs that protrude distally beyond a distal, planar, underside surface of the handwheel; and
wherein the locking mechanism is configured to be engaged by a combination of:
the non-angular force distally along the longitudinal axis moving the second lugs distally to occupy a same lateral plane occupied by the first lugs, and
the angular force of rotation rotating the second lugs to apply a portion of the angular force of rotation against the first lugs.

7. The safety system of claim 6, wherein:
each of the first lugs includes a prism with at least one right angle formed where the top surface of the coupler intersects a front face of the prism;
each of the second lugs comprise a prism identical to the prisms of each of the first lugs; and
the second lugs are configured to apply the portion of the angular force of rotation against the first lugs at interfaces between the front faces of the first lugs and adjacent front faces of the prisms of the second lugs.

8. The safety system of claim 6, wherein:
the first lugs are spaced equidistantly around a perimeter of the top surface of the coupler; and
the second lugs are spaced equidistantly around a perimeter of the underside surface of the handwheel.

9. The safety system of claim 2, wherein the handwheel is formed as a hollow, lobed cylinder that includes:
a bore;
a distal open bottom configured to enable the coupler to be located inside the bore, as a consequence of axial movements of the handwheel between a disengaged position and an engaged position; and
a closed base that includes a proximal top surface of the handwheel.

10. The safety system of claim 9, wherein the proximal top surface of the handwheel includes a hole configured to restrict the handwheel from tilting about the valve stem;
wherein the hole of the handwheel has a shape that matches a shape of the intermediate portion of the stem; and
wherein the hole of the handwheel has dimensions configured to provide a clearance space between an interior surface of the hole of the handwheel and an exterior surface of the stem, the clearance space having a size that:
enables the hole of the handwheel to slide onto the stem at the tip portion and slide distally along the intermediate portion of the stem, and
allows the handwheel to rotate independent from the stem when the locking mechanism is disengaged.

11. The safety system of claim 2, further comprising a bushing configured to:
mount onto the stem between the tip portion and a proximal top surface of the handwheel;
fit within a hole through the top surface of the handwheel and annularly around the stem such that the bushing rotates or remains stationary in unison with the stem; and
limit the handwheel from moving proximally beyond the bushing, and from tilting about the stem.

12. The safety system of claim 2, wherein the handwheel, the coupler, or both the handwheel and coupler are composed of either plastic or a machined metal part composed of brass.

13. The safety system of claim 2, wherein the handwheel, the coupler, or both the handwheel and coupler include an additive manufactured part.

14. The safety system of claim 2, wherein the valve includes a low-pressure acetylene gas cylinder valve.

15. The safety system of claim 2, wherein the coupler includes a hole dimensioned to annularly fit around an outer perimeter of the base of the stem.

16. The safety system of claim 15, wherein:
the base of the stem includes a uniform rectangular shaped lateral cross-section,
the intermediate portion of the stem includes a round shaped lateral cross-section, and
the hole of the coupler includes a rectangular shaped lateral cross-section similar to the lateral cross-section of the base of the stem.

17. The safety system of claim 15, wherein the hole of the coupler includes a proximal upper portion having a rectangular shaped lateral cross-section and a distal lower portion having a round shaped lateral cross-section.

18. A method of operating a gas cylinder valve, the valve including a valve stem being rotatable to actuate the valve to an open position and a closed position, the stem having a proximal end tip portion, a distal end base, and a center longitudinal axis of rotation, the method comprising:
providing a safety system for the stem, the safety system having:
a coupler including a first engagement mechanism, wherein the coupler is configured to rotate the stem in unison with rotation of the coupler or remain stationary in unison with the stem while the stem is stationary; and
a handwheel including a second engagement mechanism of a locking mechanism defined by the first and second engagement mechanisms, the second engagement mechanism configured to engage in surface-to-surface contact with the first engagement mechanism such that the handwheel transfers torque to the coupler;
mounting the coupler onto the base of the stem;
mounting the handwheel onto an intermediate portion of the stem between the tip portion and a top surface of the coupler;
rotating the handwheel about the longitudinal axis, by applying at the handwheel, an angular force of rotation in a lateral plane, wherein the rotation of the handwheel is in unison with the coupler when the locking mechanism is engaged, and wherein the rotation of the handwheel is independent from the coupler when the locking mechanism is disengaged; and
disengaging the locking mechanism, in two alternative ways:
in response to receiving the angular force of rotation in the lateral plane; or
in response to receiving a non-angular force in a proximal direction along the longitudinal axis.

19. The method of claim 18, further comprising:
engaging the locking mechanism in response to receiving, at the handwheel, a combination of:
the angular force of rotation in the lateral plane, and
a non-angular force distally along the longitudinal axis; and
rotating the handwheel and the coupler in unison about the longitudinal axis and in the direction of the angular force when the locking mechanism is engaged, thereby also rotating the stem in unison with the handwheel and the coupler.

20. The method of claim 19, further comprising overriding the locking mechanism:
when the valve is fully opened or fully closed, in response to receiving the combination of:
the angular force of rotation in a valve opening direction or a valve closing direction, respectively, and
the non-angular force distally along the longitudinal axis; and
by rotating the handwheel independent from the coupler, in the valve opening direction or the valve closing direction, respectively, by forcing the second engagement mechanism to override the first engagement mechanism in surface-to-surface contact,
wherein the coupler remains stationary in unison with the stem.

* * * * *